Figure 1:
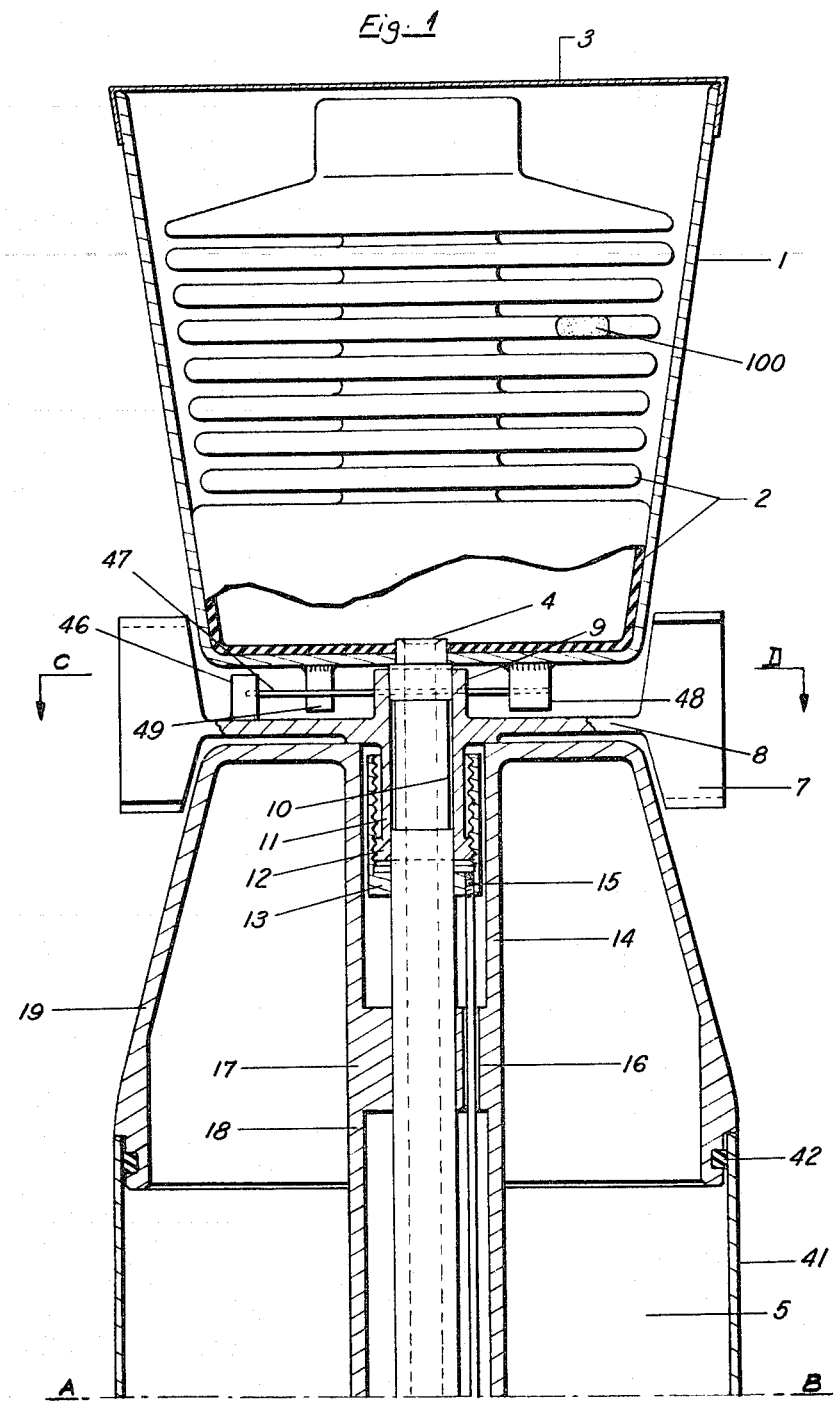

Oct. 18, 1966 G. MAES 3,278,956
PNEUMATIC FLOAT CONTROL DEVICE FOR RADIOSONOBUOYS
Filed Jan. 18, 1965 3 Sheets-Sheet 1

Oct. 18, 1966　　　　　G. MAES　　　　　3,278,956
PNEUMATIC FLOAT CONTROL DEVICE FOR RADIOSONOBUOYS
Filed Jan. 18, 1965　　　　　　　　　　　　3 Sheets-Sheet 2

Oct. 18, 1966  G. MAES  3,278,956
PNEUMATIC FLOAT CONTROL DEVICE FOR RADIOSONOBUOYS
Filed Jan. 18, 1965  3 Sheets-Sheet 3

United States Patent Office 3,278,956
Patented Oct. 18, 1966

3,278,956
PNEUMATIC FLOAT CONTROL DEVICE FOR RADIOSONOBUOYS
Guy Maes, Neuilly, Seine, France, assignor to L'Electronique Appliquee, Paris, France
Filed Jan. 18, 1965, Ser. No. 426,196
Claims priority, application France, Jan. 21, 1964, 961,035, Patent 1,391,091
7 Claims. (Cl. 9—8)

The present invention concerns improvements in or relating to the radiosonobuoys which are intended to be thrown to the sea and which include a float inflatable from a reserve of compressed gas carried within the body thereof. The control of the inflation of the float must be automatic and preferably must be operative as soon as the buoy is thrown in order that said float is completely developed at the impact on the water.

The initiation of the inflation of the float must be ensured very quickly after the buoy is thrown from the carrier aircraft because in several cases, said aircraft will fly at lower altitudes, and the control device for such an inflation must preferably not comprise heavy or rigid parts detachable from the body of the buoy for avoiding any risk of deterioration of the carrier aircraft or of another neighbouring aircraft by such flown out parts. On the other hand, the said control device must be satisfactorily safe not to be untimely triggered during handling of the buoy or at the opening of the trap through which said bouy will be thrown.

An object of the invention is to provide such a control device of quick operation but incapable to be accidentally operated by handling or premature action.

According to a feature of the invention, such a device for controlling the inflation of a float housed within the upper part of the buoy, from a reserve of compressed gas located within a lower part of said buoy, is mainly characterized in that it comprises an eolienne wind-engine surrounding an intermediate part between the compartment of the buoy within which is housed the said compressed gas reserve and the upper part of the buoy housing the inflatable float, a screw and nut arrangement and means for driving one of the said parts, screw or nut, into rotation from the rotation of the eolienne arrangement under the action of the air during the fall of the buoy, means for blocking one of said parts from rotation but leaving it free to be driven in translation from the rotation of said other part, means connected to said translatable member to actuate a trigger opening the said compressed gas reserve into said inflatable float after a number of turns of said eolienne arrangement and consequently inflating said float, and means connected to said translatable member for separating the two parts, screw and nut so that the eolienne arrangement can freely rotate without further action on said translatable part once said trigger opening has been actuated.

According to a further feature of the invention, means are provided in such a device for creating an initiating resistive torque for the rotation of said eolienne arrangement at such a value that only the fall of the buoy can initiate the rotation of said arrangement so that a mere air-draught cannot activate the device (the protection against accidental start of inflation during handling operation being ensured from the number of turns the eolienne arrangement must make prior the actuation of the trigger opening of the compressed gas reserve.)

Figure 2:
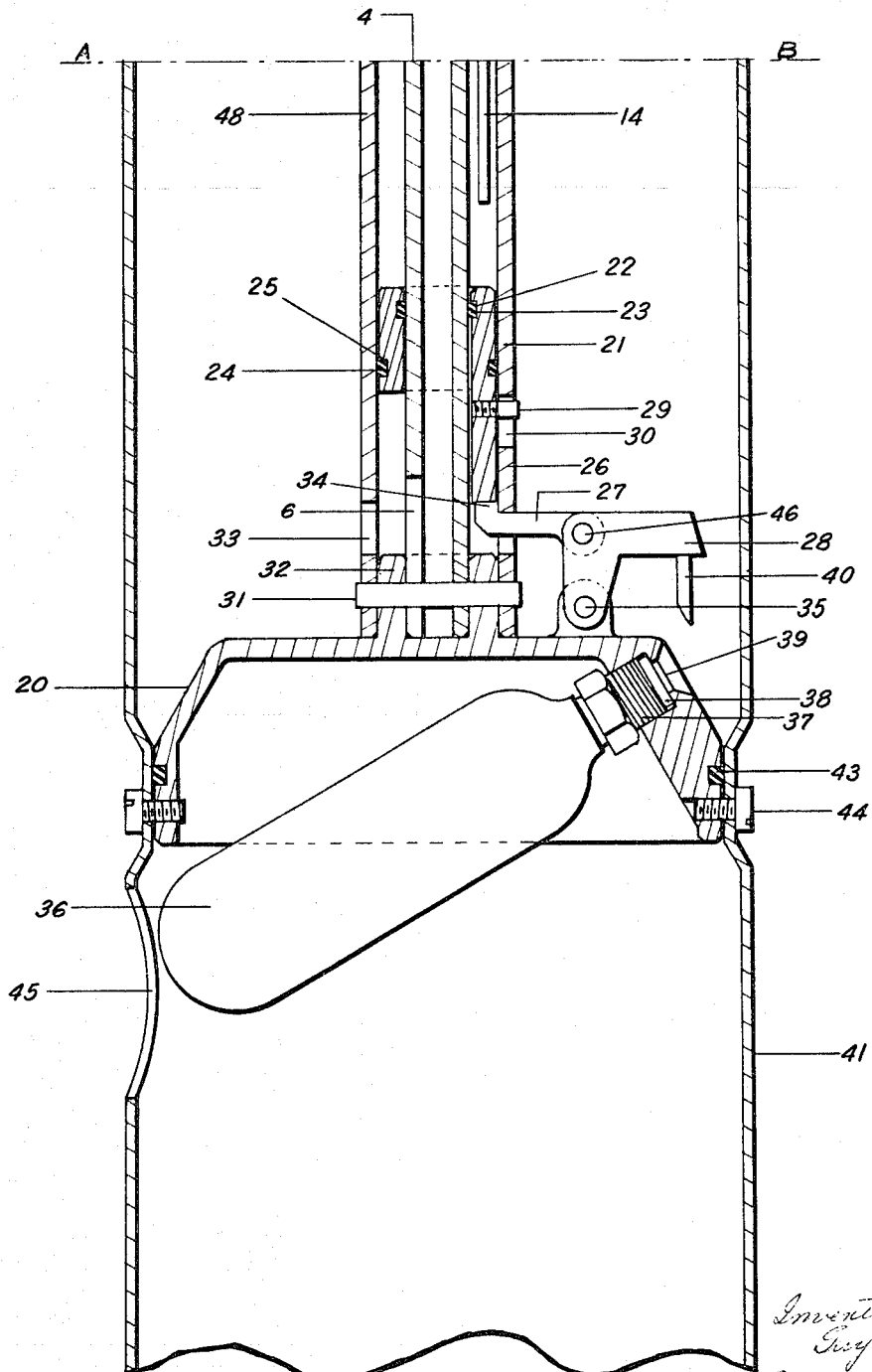
Figure 3:
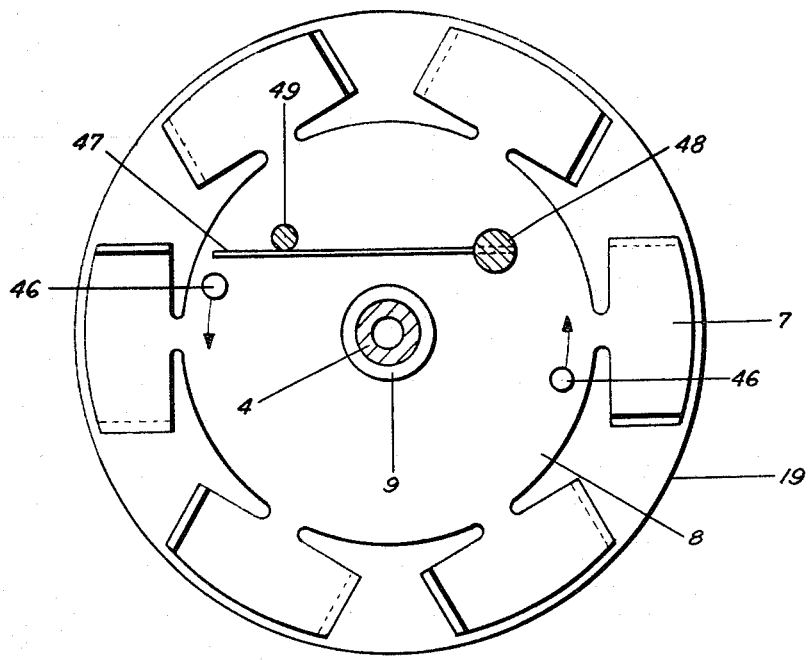

The invention will be described in more details with reference to the accompanying drawings, wherein:

FIG. 1, together with FIG. 2 when placed below FIG. 1, show an illustrative embodiment of the invention; these FIGS. 1 and 2 are elevation views, each partly in cross-section, the remaining part of the buoy and details thereof useless for the understanding of the invention being unshown;

FIG. 3 shows a transverse view according to line C—D of FIG. 1.

Any technical modification of the elements of the device shown in said figs. comes within the scope of the invention.

At the top of the buoy is provided a casing 1 with a top wall made of a low resistance material such for instance gold beater's skin 3. Within said casing is folded the gas-bag 2 of the inflatable float. Said bag communicates through a central pipe 4 with an airtight compartment 5 within which are for instance placed the electronic equipment parts, not shown as being outside the scope of the invention. The volume of said compartment is made relatively important and, for instance, of one-third of the volume of the float bag. Said float will be inflated during the fall of the buoy and, at the impact on the water, it will be capable of deformation without any risk of rupture since part of the gas it then comprises might at said impact flow temporarily back within said compartment 5, whereas the action of the inflated float during the fall, i.e. a reduction of the speed of the fall, has been duly ensured. Once the speed of the buoy reduced within the water, the gas-bag can take again its normal shape and volume as the compressed gas pushed within the compartment 5 at the impact can then return within the bag. Said bag may be for instance glued by its bottom within the casing 1 or the fixation thereof to the casing may be effected by any other suitable fashion.

The casing 1 may be soldered on the tube or pipe 4 for instance, in order to ensure the air tightness of the bag and compartment. The pipe 4 also acts as an assembly member, a rotation axle for the eolienne arrangement to be described, a gas pipe and an electrical duct for the passage of wires within the float up to the electronic equipment within the compartment 5. From this last point of view, a slot 6 is made in the lower part of the pipe 4 and it must be understood that the gas bag houses a wire aerial which is developed as the float is inflated. Such a combination of a developable aerial and an inflatable float is already known per se.

The eolienne arrangement comprises a body 7, for instance in sheet-iron, formed or moulded, and a disk-shaped member 8 coaxial to a hollow hub 9. The inner cylinder wall of said hub 9 rotates around the pipe 4 on which is provided a clearance 10 in this respect. The inner part of the hub 9 is threaded at 12 on which engages a nut 13. The length of the nut and the threading pitch are so choosen that a determined number of turns of the eolienne arrangement is necessary before the inflation of the bag is triggered. Said number of rotations may be for instance twenty-five so that a complete safety against undue rotation of the eolienne arrangement from accidental movement during the handling period of the buoy is obtained.

A rod 14, threaded at 15 within the nut 13, passes through a duct 16 of an embossing 17 of the body 18 of the head 19 of the buoy on which is mounted the eolienne and casing arrangement with the watertight partition 20. Said rod 14 blocks the rotation of the nut but, on the other hand, ensure the translation of a piston 21 from its lowering down by the nut. Said piston 21 ensures the tightness of the compartment 5 through joints, which are preferably toroids: a ring 22 is placed within a housing 23 for the airtightness between 21 and 4 and another ring 24 within a housing 25 ensures an airtight joint between 21 and 18. The piston 21 also comprises a finger 26 pressing against a trigger 27 of a hammer 28. A lug 29 threaded into the finger 26 prevents the rotation of 21 and a window 30, in the body 18 admits the piston to go down.

The fixation of 18 and 4 on the partition 20 may be ensured by means of a pin 31 passing through 18, 22 and 4.

The trigger 27 passes through 18 from a window 33 in 18 and is abutting, by means of a spring (not shown for the clarity of the drawing), a shoulder of 27 within 18 opposing to the rotation of the trigger around axle 35, the hammer 28 being urged by another spring (equally not shown on the drawing for the sake of clarity).

A compressed gas bottle 36 is threaded by its head 37 in a threaded housing of the partition 20, a hole 39 permitting the passage of the striker 40 when 28 is rotated.

The airtightness of the compartment 5 is ensured when the outer casing 41 of the buoy sliding on joints 42 of the head 19, and 43 of the partition 20, is assembled to the buoy. A narrowing within 41 permits to joint 42 to slide only a short distance and to the heads of the fixation screws 44 to be housed. A hole 45 is provided in the casing 41 for mounting and removing the gas bottle 36 which is located within an un-airtight compartment of the buoy.

On the cross-section view of FIG. 3, the eolienne arrangement 7 is shown with the disk 8 comprising the hub 9 journalled on the pipe 4. Two diametrically opposed lugs 46 are provided on 8, the one or the other being arrested by a flat spring 47 affixed to a lug 48 secured to the casing 1. The spring 47 cannot be brought rearwards as it abuts on a tab 49 secured to 1, so that the eolienne arrangement can only rotate in the direction of the arrows when the driving torque becomes higher than the resistant torque due to 47.

The operation may be explained as follows: When the buoy is thrown from an aircraft, head backwards, the air pressure on 7 imparts to the eolienne arrangement a driving torque higher than the resistant torque from spring 47. One of the lugs 46 escape the spring, the arrangement is free to rotate and its speeds grows. When, one-half of a turn later, the other lug 46 contacts 47, which has returned against 49, the kinetic energy of the system, associated to its driving torque, produces the repelling without substantial reduction of speed of the spring 47; finally, the maximum stable speed of rotation is quickly obtained: for instance, and illustratively, when said speed has been defined as being 6,000 rotations per minute, corresponding to 100 rotations per second, the 25 safety rotations will, at a speed of 360 kilometres per hour, be effected within .25 second.

The screw 12 integral with the eolienne arrangement has, during said 25 rotations, pushed down the nut 13 and the rod 14 comes abutting on the piston 21 which thereafter is pushed down expelling the shoulder 34 of the trigger 27, pivoted at 46 on the hammer 28. As soon as 34 is out of contact with 18, it passes through the window 33, the hammer 28 strikes down, the striker 40 perforates the closing diaphragm of the bottle 36 and the compressed gas escapes through 39 within the compartment 5 and, from said compartment, passes within the gas bag 2 through the windows 33 of 18 and 6 of pipe 4. The casing 1 only admits the inflation of the bag 2 when said bag breaks through the top diaphragm 3. The bag is thus free to expand outside the casing 1 and takes its predetermined shape and volume. The length of the screw 13 is so provided that it escapes the nut 12 after the actuation of the trigger 27 so that the eolienne arrangement may continue to rotate without any further action on the device. At the impact of the buoy on the sea level, as said, the gas bag is partially retracted by reintroduction of part of the gas within the compartment 5 until the pressure equilibrates and, when the buoy is afloat, the gas bag is again totally inflated.

On the bag, there is shown at 100 a special patch masking an orifice. Said patch is made with a material which dissolves at a slow rate from the presence of salt. From such provision, after a predetermined time interval, necessary to said patch to dissolve, the float will deflate and the buoy will sink as requested if not previously "fished up."

What is claimed is:

1. In a radiosonobuoy, a device controlling the inflation of an inflatable bag float housed within an upper part of the buoy from a reserve of compressed gas located within a lower part of said buoy, comprising the combination of an eolienne arrangement capable of rotation around a part of the buoy beneath the said upper part housing the inflatable bag float, a trigger arrangement for opening the said reserve of compressed gas and means controlled from the rotation of said eolienne arrangement during the fall of the buoy from the aircraft from which it is thrown to the sea level for actuating said trigger arrangement and consequently inflating said float during said fall.

2. Device according to claim 1, wherein an airtight volume of substantial capacity is inserted between said compressed gas reserve and the input of said inflatable bag float.

3. Device according to claim 1, wherein said means comprise a two member arrangement, screw and nut, one of said members being rotated from said eolienne and driving the other member in translation pushing downwards a rod for the actuation of said trigger arrangement after a predetermined number of rotations of said eolienne.

4. Device according to claim 3, wherein the pitch of the threads of said screw and nut and the length of the translatable member of the two are provided on the one part for ensuring a small number of inactive rotations of the eolienne arrangement prior the drive of the rod and on the other part for ensuring a disengagement of the members after the rod has triggered said trigger arrangement.

5. Device according to claim 3, wherein a rigid pipe connects the inlet of said bag float to a compartment wherein the compressed gas will flow after the triggering actuation of the reserve, said eolienne arrangement comprises a hub journalled over said pipe and said hub comprises an extension which is threaded for constituting one of said member and a sheath surrounds said threaded part and the lower part of said pipe for acting as a guide for the other member cooperating with said threaded part and for said actuating rod.

6. Device according to claim 1, wherein said inflatable bag is housed within a casing the top wall of which is made of a diaphragm torn out by the push of the bag when inflated.

7. Device according to claim 6, wherein in said bag there is provided a patch dissolving at a slow rate from the salt water atmosphere.

References Cited by the Examiner

UNITED STATES PATENTS 2,587,564    2/1952    Williams _____ 9—8

MILTON BUCHLER, *Primary Examiner.*

T. MAJOR, *Assistant Examiner.*